3,002,963
GAS PHASE POLYMERIZATION UTILIZING A FREE-SETTLING, FLUIDIZED CATALYST AND REACTOR SYSTEM THEREFOR
Edward L. Czenkusch and William L. Fawcett, Bartlesville, Okla., assignors to Phillips Petroleum Company, a corporation of Delaware
Filed Apr. 22, 1957, Ser. No. 654,337
8 Claims. (Cl. 260—94.9)

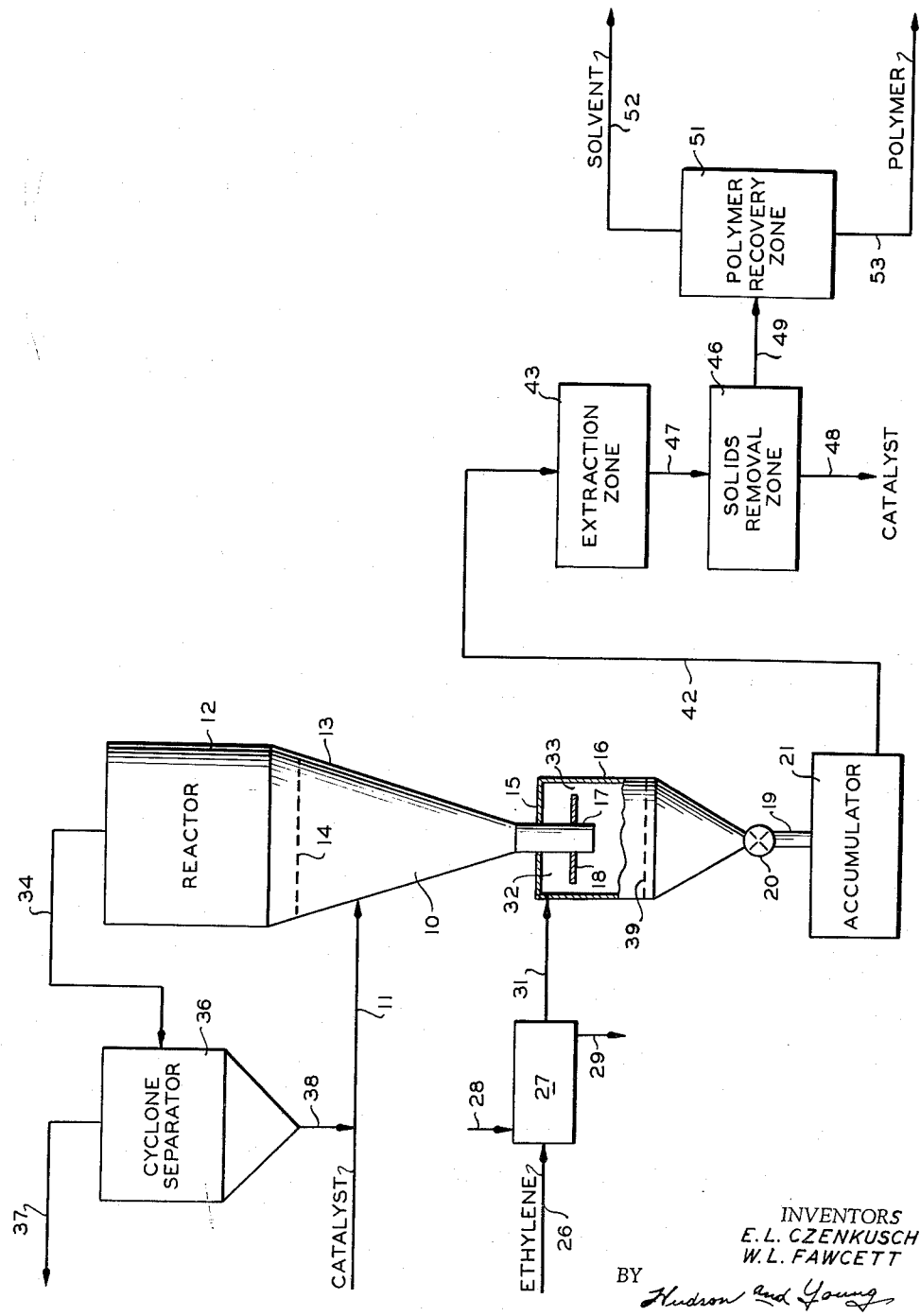

This invention relates to an improved olefin polymerization process. In one aspect, it relates to an improved reactor system for use in polymerization processes. In another aspect, it relates to a process for the gas phase polymerization of olefins to produce high molecular weight solid polymers.

Various methods are described in the literature for producing normally solid and semisolid polymers. For example, hydrocarbons, such as ethylene, propylene, isobutene, butadiene, and styrene, can be polymerized, either independently or in various admixtures with one another, to produce solid or semisolid polymers. Recently, considerable attention has been directed toward the production of solid olefin polymers, such as polymers of ethylene and/or propylene. The polymerizations are frequently carried out in the presence of a solid catalyst, utilizing a liquid solvent as the reaction mixture. As described in detail hereinafter, the present invention is concerned with a process and system for conducting such polymerizations in the gaseous phase.

It is an object of this invention to provide an improved process for polymerizing olefins.

Another object of the invention is to provide a polymerization process for producing high molecular weight solid polymers, which uses a free-fall, fluidized solid catalyst system.

Still another object of the invention is to provide a process for the gas phase polymerization of olefins which does not require the use of a liquid solvent as the reaction medium.

A further object of the invention is to provide an improved reactor system for use in olefin polymerization processes.

Still further objects, advantages and features of the invention will become apparent to those skilled in the art upon consideration of the accompanying disclosure.

The instant invention relates to an improved reactor system and to its use in a polymerization process. In one embodiment, the invention resides in a reactor which comprises an enclosed, upright shell, the upper portion of the shell being substantially cylindrical in shape with the lower portion being substantially in the form of an inverted cone, a polymer collection vessel disposed below the shell, conduit means connected to the lower conical portion of the shell and extending into the collection vessel, feed inlet means connected to the collection vessel, catalyst inlet means connected to the conical portion of the shell, and fluid outlet means connected to the upper portion of the shell.

In another embodiment, the invention resides in an improved polymerization process in which an olefin is contacted with a free-fall or free-settling, fluidized polymerization catalyst. The process comprises introducing an olefin feed into a feed zone, passing the feed upwardly through a communication zone into a reaction zone of gradually increasing cross-sectional area, contacting the feed with a free-settling, fluid catalyst within said reaction zone, and removing catalyst coated with polymer from the reaction zone through the communication zone.

The present invention is broadly applicable to the production of solid polymers employing solid catalysts, and more particularly to processes in which a polymerizable hydrocarbon is contacted with a free-settling fluidized catalyst. However, the invention is especially applicable for use in the production of polymers of ethylene and copolymers of ethylene and other unsaturated hydrocarbons using a chromium oxide-containing catalyst as described in the copending U.S. patent application of J. P. Hogan and R. L. Banks, Serial No. 573,877, filed March 26, 1956, now U.S. Patent 2,825,721. As set forth in this application in more detail, the catalyst comprises, as an essential ingredient, chromium oxide, preferably containing a substantial amount of hexavalent chromium. The chromium oxide is ordinarily associated with at least one other oxide, particularly at least one oxide selected from the group consisting of silica, alumina, zirconia, and thoria. One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound ignitable to chromium oxide. Examples of such compounds are chromium trioxide, chromium nitrate, chromium acetate, and ammonium chromate. The composite resulting from the impregnation step is dried and then contacted for a period of several hours at a temperature of from about 450 to 1500° F., preferably from about 900 to about 1000° F., for example, with a stream of a substantially anhydrous oxygen-containing gas, such as air. A catalyst often preferred is one in which the oxide or oxides other than chromium oxide have been treated with a fluoride, e.g., a volatile fluoride, such as hydrogen fluoride, followed by heating to remove residual volatile fluoride. A further improvement can be effected by the presence of strontium oxide in the catalyst, as set forth in more detail in the copending U.S. patent application of J. P. Hogan and R. L. Banks, Serial No. 433,804, filed June 1, 1954, now U.S. Patent 2,846,425. When using the above-described catalyst in the practice of the process of the instant invention, ethylene and mixtures of ethylene with other unsaturated hydrocarbons are used as the feed material. For example, ethylene or mixtures of ethylene with minor amounts of higher 1-olefins, such as propylene, 1-butene, 1-pentene, 1-hexene, 4-methyl-1-pentene, 4-methyl-1-hexene, 5-methyl-1-hexene, 6-methyl-1-hexene, and the like, can be polymerized to give non-tacky, solid polymers. While the amount of co-monomer which is ordinarily used varies with the particular 1-olefin, in general, the amount in the feed is less than that which, under the polymerization conditions employed, results in a tacky copolymer. Larger amounts of lower molecular weight than higher molecular weight 1-olefins can generally be utilized. Usually, it is preferred to use not more than 15 weight percent, more desirably not more than 10 weight percent, of the comonomer in the feed mixture.

In the practice of the process of this invention, the catalyst is employed in finely divided form having a particle size in the range of 40 to 100 mesh, preferably in the range of 60 to 100 mesh. However, finer particles can be used, depending upon available facilities for recovering or removing the solids from the product streams. The preferred chromium content of the chromium oxide catalyst is in the range of 0.1 to 10 weight percent, and it is further preferred that at least 0.1 weight percent of the catalyst be chromium in the hexavalent state.

A more comprehensive understanding of the invention can be obtained by referring to the drawing which is a flow diagram illustrating a preferred embodiment of the invention. While the invention will be described with relation to the polymerization of ethylene employing a specific catalyst, it is to be understood that it is not intended to so limit the invention. Thus, the invention is broadly applicable to the polymerization of polymerizable hydrocarbons in the presence of comminuted, solid catalyst.

As shown in the drawing, a chromium oxide catalyst, prepared as described hereinbefore and having a particle size in the range of 40 to 100 mesh, enters reactor 10 through line 11. Any suitable inert gas, such as ethane or nitrogen, can be employed as a carrier gas for the purpose of introducing the catalyst into the reactor. Reactor 10 is of special construction so as to provide a free-fall, fluid bed system. As illustrated, the reactor comprises a shell having a substantially cylindrical upper portion or zone 12 and an inverted conical lower portion or zone 13. The inverted conical section functions primarily as a reaction zone whereas the cylindrical section serves as a catalyst separation zone.

During normal operation, the catalyst surface is located at about the intersection of the conical and cylindrical sections, preferably somewhat below the intersection of these two sections as indicated by reference numeral 14. Disposed below the conical reaction section of the reactor is a collection vessel 16. Conduit 17 connected to the lower end of conical section 13 extends into the collection vessel and serves as a communication zone joining the conical reaction section with the collection vessel. The upper portion of collection vessel 16 is closed by closure member 15 through which conduit 17 extends. An annular ring 18 having a diameter smaller than that of the collection vessel is attached to the lower portion of conduit 17. The lower portion of collection vessel 16 is preferably conical in shape to facilitate removal of solid material through conduit 19. A suitable flow control means, such as star valve 20, which is provided in conduit 19, functions to prevent release of reactor pressure into accumulator 21.

A gas stream containing ethylene, which enters the system through line 26, is passed through heat exchanger 27. In heat exchanger 27, the temperature of the ethylene is adjusted to the desired reactor inlet temperature by being passed in indirect heat exchange with a heat exchange fluid which is circulated through the heat exchanger by means of lines 28 and 29. In general, the polymerization temperature within reactor 10 is maintained below the melting point of the polymer in order to prevent agglomeration of the catalyst particles and sticking of catalyst particles to the reactor walls. Polyethylenes produced in the presence of a catalyst of the type above discussed usually have melting points in the range of 240 to 260° F. Accordingly, the reaction temperature is generally controlled so as to be below this temperature range, with about 150° F. ordinarily being the minimum reaction temperature. A preferred reaction temperature is within the range of 150 to 250° F. and more desirably in the range of 200 to 250° F. A diluent gas, such as ethane, can be used in conjunction with the ethylene to effect heat absorption and thereby control the reaction temperature, although excess ethylene can also perform this function. A preferred pressure range is from atmospheric pressure to 500 p.s.i., although higher or lower pressures can be used. It is usually desirable to limit the conversion occurring within the reactor so that at least a 6:1 recycle ratio can be maintained and thereby effect a good temperature control.

After passing through heat exchanger 27, the ethylene is introduced by means of line 31 into annular feed zone 32. The annular feed zone is formed by the upper portion of collection vessel 16, conduit 17, and annular plate member 18 attached to conduit 17. The ethylene leaves feed zone 32 through annular opening 33, passing downwardly through the collection vessel and thereafter reversing its direction of movement so as to pass upwardly through conduit 17. The upwardly moving ethylene contacts the catalyst bed within conical reaction zone 13 and therein undergoes reaction to form polyethylene.

The catalyst bed employed in conical reaction zone 13 differs from a conventional fluidized system in that the catalyst is maintained under free-fall conditions throughout that zone. Thus, the catalyst is dispersed in the reactor in a comparatively low concentration compared to that maintained in a conventional reactor. In a conventional reactor, considerable interaction or collisions take place between particles, thereby resulting in hindered-settling conditions. In the practice of the instant process, the gas velocity in the reactor is below the transport velocity for the fine catalyst particles in the upper portion of the reactor in order that the catalyst may be retained in the reactor. Heat transfer from the solid catalyst to unconverted ethylene is facilitated by the free-settling bed. In general, the concentration of catalyst maintained within the conical reaction zone is such that contact between individual catalyst particles is very infrequent or substantially non-existent. A suitable range of catalyst concentration is from 0.1 to 5 pounds of catalyst per 100 pounds of ethylene- containing gas.

Unconverted ethylene passes upwardly into cylindrical section or zone 12 which functions as a catalyst separation zone. In this zone, entrained catalyst contained in the unconverted ethylene is separated out and drops downwardly into the catalyst bed within the conical reaction zone. Substantially catalyst-free ethylene is removed from reactor 10 through line 34 and passed into a separator, such as cyclone separator 36. In separator 36, any small amount of catalyst fines carried out of the reactor are separated from the gas stream. The gas removed from the separator through line 37 can then be recycled to line 26 or line 31, as desired, after being cooled and compressed. As mentioned hereinbefore, the recycle ratio can be regulated so as to effect a desirable polymerization temperature control. The catalyst separated from the overhead gas stream recovered from reactor 10 is withdrawn from separator 36 through line 38. Line 38 is shown as being connected to line 11 in order that the catalyst may be recycled to reactor 10.

As the reaction continues within conical reaction zone 13, solid polymer forms on the catalyst particles so that the particles increase in size. With this increase in size, particles tend to come to equilibrium lower down in the reaction zone until a maximum size is finally reached at which time they pass downwardly through conduit 17. The catalyst and deposited solid polymer pass through conduit 17 countercurrent to the rising ethylene and thereafter drop into polymer collection vessel 16 wherein they form a polymer bed 39. The catalyst particles with deposited polymer, which are withdrawn from collection vessel 16 through star valve 20, are then passed by means of conduit 19 into accumulator 21.

The catalyst particles with deposited polymer are removed from accumulator 21 through line 42 and then passed into extraction zone 43. In the extraction zone, which can be a pressure vessel provided with a mechanical stirrer, the catalyst with deposited polymer is contacted with a suitable solvent for the polymer. Suitable solvents are paraffinic and/or naphthenic hydrocarbons which are liquid under the conditions at which the catalyst-polymer mixture is treated. Ordinary paraffins and naphthenes having from 3 to 12 carbon atoms per molecule are suitable, those having at least 5 carbon atoms per molecule being preferred because of their higher solvent power. Aromatic hydrocarbons such as benzene and the xylenes, and certain liquid olefins, also act as solvents for the polymer. Aromatic hydrocarbons have a deleterious effect on the chromium oxide catalyst and, therefore, are not preferred when the catalyst is to be returned directly to the reactor. However, where the catalyst is to be discarded or subsequently regenerated or reactivated, an aromatic hydrocarbon can be utilized for extracting the polymer product from the catalyst, as can non-hydrocarbon solvents, such as carbon disulfide, and liquid halogenated compounds, such as tetrachloroethane and carbon tetrachloride.

The extraction carried out in zone 43 is conducted under a pressure sufficient to maintain the solvent substantially in the liquid phase. The temperature will depend, to some extent, on the characteristics of the polymer and the particular solvent used, but is ordinarily higher than the temperature in the reaction zone. Generally, a temperature in the range of 300 to 350° F. is adequate although temperatures outside of this range can be used so long as dissolution is obtained without polymer decomposition. The optimum temperature for any particular solvent and polymer is readily determined by routine tests. The resulting solution is then passed into solids removal zone 46 through line 47 wherein it is treated by any method known in the art to remove the suspended catalyst. Such methods include filtration, centrifugation, settling, thickening, sedimentation, and the like. The catalyst thus separated is removed from zone 46 through line 48 and can be recycled to the reaction zone, regenerated, reactivated, or discarded, as conditions may indicate.

The solids-free solution of polymer which is recovered from solids removal zone 46 through line 49, is then passed into polymer recovery zone 51. The polymer recovery zone can be any suitable means for the recovery of the polymer from the polymer solution. For example, zone 51 can comprise a series of evaporation steps. The zone can also comprise cooling and filtration equipment whereby the dissolved polymer is precipitated from solution by cooling the solution and then filtering. The solvent, which is recovered from zone 51 through line 52 can be recycled to extraction zone 43. A polymer product is recovered from zone 51 through line 53.

A more complete understanding of the invention can be had by referring to the following illustrative example which is not intended, however, to be unduly limitative of the invention.

*Example*

Ethylene is polymerized utilizing a system similar to that shown in the drawing. The polymerization is carried out in the presence of a 40 to 100 mesh catalyst prepared by impregnating a 90 weight percent silica-10 weight percent alumina coprecipitated gel composite with an aqueous solution of chromium trioxide, drying, and heating for several hours in a stream of anhydrous air at about 950° F.

A gaseous feed stream comprising about 78 volume percent ethylene and 22 volume percent ethane is passed into the reactor at a rate such that about 1000 pounds per day of ethylene is supplied to the system. The catalyst described hereinabove is charged to the reactor at the rate of 10 pounds of catalyst per day. The average catalyst residence time is about four hours, and about 1⅔ pounds of catalyst is present in the reactor at all times. The linear velocity of the ethylene feed stream in the reaction zone is such as to maintain the catalyst under free-fall conditions throughout the reaction zone. Approximately one eighth of the ethylene contained in the feed stream is converted, the unconverted ethylene after passing through the cyclone separator being recycled to the reactor. A pressure of about 450 p.s.i.g. is maintained within the reactor with the reaction temperature being about 200° F. The catalyst particles and deposited polymer, which are recovered from the reaction zone, are heated to about 300° F. with cyclohexane. The resulting polymer solution is then filtered to remove the catalyst therefrom. The polymer is recovered from the polymer solution by evaporation, approximately 1000 pounds per day of polymer being obtained.

The reactor employed in this example is sized so as to retain 200 mesh and larger catalyst particles in the upper portion of the reactor and to allow 1 millimeter catalyst particles having polymer deposited thereon to pass out of the bottom of the reactor as product. When operating under the conditions described hereinbefore, the cylindrical upper portion of the reactor is 14.5 inches in diameter while the product removal conduit is 1.37 inches in diameter.

From the foregoing, it is seen that a novel reactor is provided which can be effectively used in the gas phase polymerization of olefins using a solid comminuted catalyst. It will be apparent to those skilled in the art that variations and modifications of the invention can be made from a study of the foregoing disclosure. Such variations and modifications are believed to be clearly within the spirit and scope of the invention.

We claim:

1. A process for producing a solid polymer which comprises passing gaseous material containing polymerizable olefin into a feed zone; passing said gaseous material from said feed zone in an annular gas stream; introducing said annular gas stream into a concentric, cylindrical communication zone; passing said gaseous material upwardly through said communication zone into the bottom of a vertical, uniformly expanding reaction zone; passing said gaseous material upwardly through said reaction zone; maintaining a dilute, free-settling suspension of finely divided solid catalyst within said reaction zone, said catalyst catalyzing the conversion of said olefin to solid polymer which builds up on the catalyst particles thereby forming particles of gradually increasing particle size as a function of the length of time the individual catalyst particles are in the reaction zone; maintaining the temperature within said reaction zone sufficient to effect said conversion in the presence of said catalyst but below the melting point of said polymer; continuously removing particles of polymer-coated catalyst in a maximum size range from the bottom of said reaction zone through said communication zone; continuously removing the unreacted portion of said gaseous material from the top of said reaction zone; introducing fresh catalyst to said reaction zone to replace that removed; and maintaining the feed rate of said gaseous material into said reaction zone substantially constant so that the velocity of said gaseous material steadily decreases as it passes through said expanding reaction zone, said feed rate being such that the maximum gas velocity at the bottom of said reaction zone and in said communication zone is just insufficient to suspend said particles of polymer-coated catalyst in a maximum size range and the minimum gas velocity at the top of said reaction zone is insufficient to suspend the smaller particles of fresh catalyst introduced.

2. The process of claim 1 wherein said olefin is ethylene and said catalyst comprises chromium oxide and at least one material selected from the group consisting of silica, alumina, zirconia, and thoria.

3. The process of claim 2 wherein said recovered catalyst having polymer deposited thereon is contacted with a solvent for said polymer; said polymer is dissolved in said solvent; and said polymer is recovered from the resulting polymer solution.

4. The process of claim 3 wherein the polymerization temperature is in the range of 150 to 250° F.; the pressure is in the range of atmospheric pressure to 500 p.s.i.; and polymer is dissolved in a liquid hydrocarbon solvent at a temperature in the range of 300 to 350° F.

5. The process of claim 2 wherein the polymerization temperature is in the range of 200 to 250° F. and the amount of catalyst in said reaction zone is in the range of 0.1 to 5 pounds of catalyst per 100 pounds of the ethylene-containing gaseous stream.

6. An improved polymerization reactor system which comprises, in combination, an elongated, upright shell, the upper portion of said shell being substantially cylindrical in shape with the lower portion thereof making up at least about half of said shell and being substantially in the form of an inverted cone; a closure member attached to and adapted to close said upper portion of said shell; fluid outlet means attached to the upper portion of said shell; solids inlet means attached to the lower portion of said shell; a closed cylindrical vessel positioned axially below said shell; conduit means attached to said lower portion of said shell at about the apex of said inverted cone, said conduit means extending into said closed vessel, thereby communicating the interior of said vessel with the interior of said shell; an annular plate member attached around said conduit means within said closed vessel, said annular plate member having an exterior diameter substantially smaller than the diameter of said closed vessel, and positioned to form in the upper portion of said closed vessel an annular feed chamber having an annular outlet slightly above the opening into said conduit means; feed inlet means attached to said closed vessel at a point above said annular plate; and solids outlet means attached to a lower portion of said closed vessel.

7. The reactor system of claim 6 wherein said fluid outlet means is further connected to said feed inlet means.

8. The reactor system of claim 6 wherein said fluid outlet means is attached to a gas-solids separation means provided with gas outlet means and solids outlet means, said gas outlet means being connected to said feed inlet means and said solids outlet means being connected to said solids inlet means.

References Cited in the file of this patent

UNITED STATES PATENTS

| | | |
|---|---|---|
| 2,379,711 | Hemminger | July 3, 1945 |
| 2,431,462 | Campbell et al. | Nov. 25, 1947 |
| 2,589,862 | Putney | Mar. 18, 1952 |
| 2,615,785 | Jewell | Oct. 28, 1952 |
| 2,692,257 | Zletz | Oct. 19, 1954 |
| 2,726,137 | Davis | Dec. 6, 1955 |
| 2,727,930 | Johnson | Dec. 20, 1955 |
| 2,761,825 | Schultz | Sept. 4, 1956 |
| 2,776,820 | Bond | Jan. 8, 1957 |

FOREIGN PATENTS

| | | |
|---|---|---|
| 524,064 | Canada | Apr. 17, 1956 |